US009509826B2

(12) United States Patent
Hong

(10) Patent No.: US 9,509,826 B2
(45) Date of Patent: Nov. 29, 2016

(54) METHOD AND MOBILE DEVICE FOR SELECTIVELY DISPLAYING LIST OF PERIPHERAL DEVICES BASED ON SHORT RANGE COMMUNICATION

(75) Inventor: Ji Seon Hong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 319 days.

(21) Appl. No.: 12/927,454

(22) Filed: Nov. 15, 2010

(65) Prior Publication Data

US 2011/0117842 A1 May 19, 2011

(30) Foreign Application Priority Data

Nov. 16, 2009 (KR) ........................ 10-2009-0110414

(51) Int. Cl.
*H04B 7/00* (2006.01)
*H04M 1/725* (2006.01)

(52) U.S. Cl.
CPC ................................ *H04M 1/7253* (2013.01)

(58) Field of Classification Search
CPC ............................. H04M 1/7253; H04W 8/20
USPC ......... 455/41.1, 41.2, 41.3, 557, 411, 412.1; 710/15
See application file for complete search history.

(56) References Cited

U.S. PATENT DOCUMENTS

| | | | |
|---|---|---|---|
| 7,912,503 B2* | 3/2011 | Chang et al. .................. | 455/557 |
| 2003/0073412 A1* | 4/2003 | Meade, II ........................ | 455/70 |
| 2004/0092249 A1* | 5/2004 | Sugikawa ...................... | 455/411 |
| 2008/0009309 A1* | 1/2008 | Gha .................... | H04M 1/7253 455/550.1 |
| 2009/0177810 A1* | 7/2009 | Kweon et al. ................... | 710/33 |
| 2010/0222000 A1* | 9/2010 | Sauer et al. ................. | 455/41.2 |

FOREIGN PATENT DOCUMENTS

| | | |
|---|---|---|
| KR | 10-2006-0057418 A | 5/2006 |
| KR | 10-0605653 | 7/2006 |
| KR | 10-2008-0003959 A | 1/2008 |
| KR | 10-2009-0037061 | 4/2009 |

OTHER PUBLICATIONS

Notification of Preliminary Rejection dated Jun. 16, 2015 in connection with Korean Patent Application No. 10-2009-0110414; 9 pages.
Korean Office Action and English translation issued for KR 10-2009-0110414 dated Dec. 1, 2015, 4 pgs.

* cited by examiner

*Primary Examiner* — Ping Hsieh

(57) ABSTRACT

A mobile device and method selectively displays a list of peripheral devices available for an application to be performed depending on a short range communication. When one of an end-user function and a content supported by the mobile device is selected, the mobile device acquires a profile of the selected end-user function or content. Then the mobile device acquires information about specific peripheral devices that are capable of forming a short range communication channel with the mobile device and also capable of enabling the selected end-user function or content. The mobile device outputs a list of the specific peripheral devices depending on the acquired information.

22 Claims, 3 Drawing Sheets

401

403

METHOD AND MOBILE DEVICE FOR SELECTIVELY DISPLAYING LIST OF PERIPHERAL DEVICES BASED ON SHORT RANGE COMMUNICATION

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Nov. 16, 2009, and assigned Serial No. 10-2009-0110414, the entire disclosure of which is hereby incorporated by reference.

TECHNICAL FIELD OF THE INVENTION

The present invention relates in general to a mobile device and, more particularly, to a method and mobile device for selectively displaying a list of peripheral devices available for an application to be performed depending on a short range communication.

BACKGROUND OF THE INVENTION

A mobile device refers to a kind of electronic device based on mobility and portability. With remarkable growths of related technologies, a great variety of mobile devices capable of supporting various end-user functions are increasingly popular. For instance, a mobile device may include a file playback function for playing audio/video files stored therein, a camera function for capturing still images, a video camera function for making video films, and the like.

Additionally, a conventional mobile device may not only inherently offer a mobile communication function using a base station, but may also offer a short range communication function using a Bluetooth module.

In order to use a short range communication function, a mobile device should first perform a search for peripheral devices. However, since such a search process is performed for all peripheral devices, a user may often experience too much inconvenience of selecting a desired peripheral device.

SUMMARY OF THE INVENTION

To address the above-discussed deficiencies of the prior art, it is an object of the present invention to provide a mobile device and method for selectively displaying a list of peripheral devices available for an application to be performed depending on a short range communication. Accordingly, the present invention is to address the above-mentioned problems and/or disadvantages and to offer at least the advantages described below.

According to one aspect of the present invention, provided is a method for selectively displaying a list of peripheral devices in a mobile device, the method includes selecting one of an end-user function and a content supported by the mobile device; acquiring a profile of the selected end-user function or content; acquiring information about at least one peripheral device that is capable of forming a short range communication channel with the mobile device and enabling the selected end-user function or content; and outputting a list of the at least one peripheral device based on the acquired information.

According to another aspect of the present invention, provided is a mobile device for selectively displaying a list of peripheral devices, the mobile device includes: a control unit configured to, when one of end-user functions and contents is selected, acquire information about at least one peripheral device that is capable of enabling the selected end-user function or content, and to produce a list of the at least one peripheral device based on the acquired information; a display unit configured to display the produced list of the at least one peripheral device; and a short range communication module configured to form a short range communication channel with the at least one peripheral device.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network. This invention may, however, be embodied in many different forms and should not be construed as limited to the embodiments set forth herein. Rather, the disclosed embodiments are provided such that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent embodiments of the invention, the drawings are not necessarily to scale and certain features may be exaggerated or omitted in order to better illustrate and explain the present invention.

A system that supports displaying of a list of peripheral devices based on a short range communication includes at least one peripheral device capable of establishing a short range communication channel with a mobile device. A peripheral device may include a headset, an MP3 player, an audio system, a TV, a computer, other mobile device, and any other equivalents. Such a peripheral device may include a short range communication module in order to establish a short range communication channel with a mobile device. In some embodiments, each individual peripheral device may include a short range wireless communication module based on Bluetooth®, Zigbee®, UWB (ultra wideband), and the like.

Now, a mobile device that performs a search for peripheral device depending on a specific profile will be described in detail with reference to FIG. 1.

Figure 1:
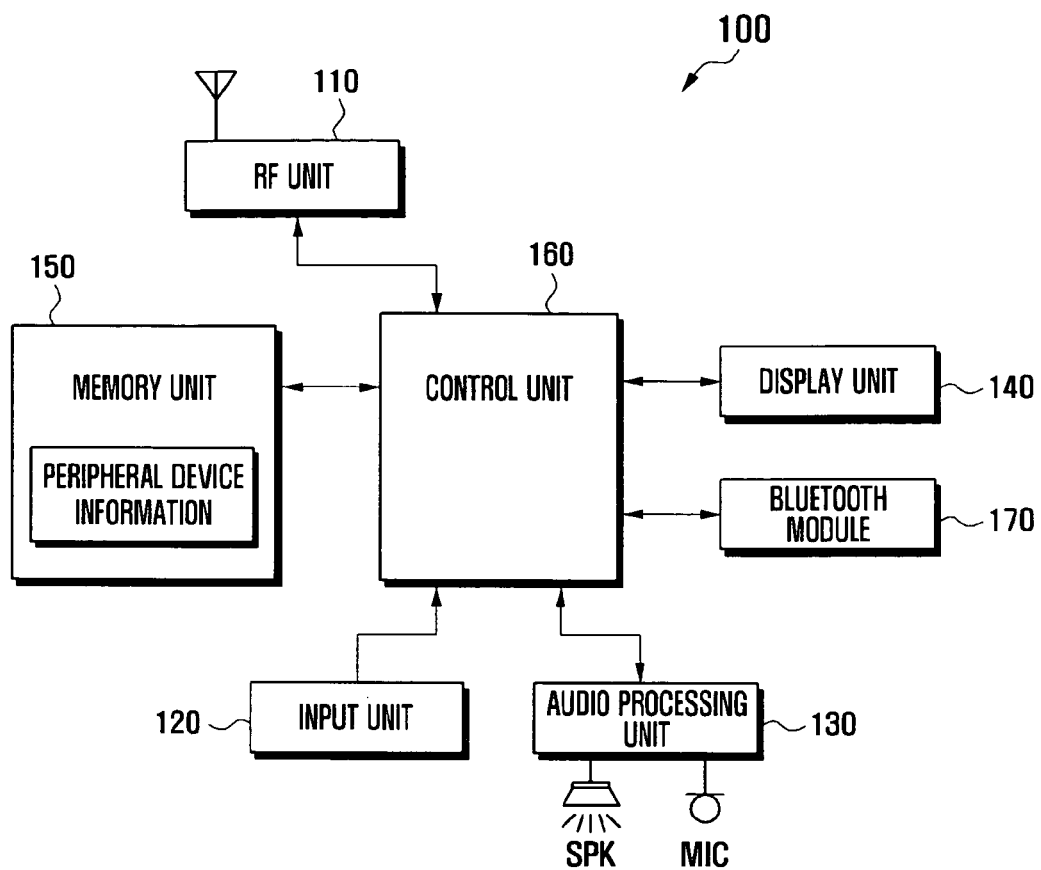
FIG. 1 illustrates a configuration of a mobile device in accordance with an embodiment of the present invention.

FIG. 1 illustrates the configuration of a mobile device in accordance with an embodiment of the present invention.

Referring to FIG. 1, the mobile device 100 includes a radio frequency (RF) unit 110, an input unit 120, an audio processing unit 130, a display unit 140, a memory unit 150, a Bluetooth® module 170, and a control unit 160. Although this embodiment uses the Bluetooth module 170 as a short range communication module, this is exemplary only and not to be considered as a limitation of the present invention. As mentioned above, any other modules such as a Zigbee® communication module, a UWB communication module, an infrared communication module, or another suitable module, may be alternatively used instead of the Bluetooth module 170.

The mobile device 100 that includes the above elements searches peripheral devices by controlling the Bluetooth module 170 in response to a user's input and then controls the display unit 140 to display a search result. In some embodiments, the mobile device 100 searches selected peripheral devices that are available for a particular end-user function or file playback a user desires to perform. For instance, the mobile device 100 performs a parsing of service identifications with regard to peripheral devices that respond to an inquiry of the Bluetooth module 170, and thereby deletes other peripheral devices from search results by considering them as failing to support a relevant service. Then the mobile device 100 does not perform a given process (e.g., a get name process in the Bluetooth module) for establishing a short range communication channel with regard to deleted peripheral devices.

Therefore, a user can easily choose a desired peripheral device by checking a list of selected peripheral devices displayed on the display unit 140. Now, each individual element of the mobile device 100 will be described in detail.

The RF unit 110 establishes communication channels necessary for a voice call, a video call, data transmission, and so forth, under the control of the control unit 160. Namely, the RF unit 110 forms a voice call channel, a video call channel, a data communication channel, and so forth, with a mobile communication system. Additionally, the RF unit 110 may include an RF transmitter that upwardly converts the frequency of signals to be transmitted and amplifies the signals, and an RF receiver that amplifies received signals with low-noise and downwardly converts the frequency of the received signals. If the mobile device 100 does not support a mobile communication function, the RF unit 110 may not be removed from the mobile device 100.

The input unit 120 includes a plurality of input keys and function keys to receive a user's input and to set various functions. The function keys may have navigation keys, side keys, shortcut keys, and any other special keys defined to perform particular functions. Additionally, the input unit 120 may create input signals related to a user's setting or a function control of the mobile device 100 and then deliver them to the control unit 160. In some embodiments, the input unit 120 may create an input signal for enabling a particular end-user function or file playback supported by the mobile device 100, an input signal for a file search, an input signal for a file selection, an input signal for searching peripheral devices based on the Bluetooth module 170, and an input signal for selecting a specific peripheral device in a list of searched peripheral devices. The input unit 120 may then send such input signals to the control unit 160. The input unit 120 may be formed of a keypad that includes a specific key layout, or a virtual key map in a touch screen. For instance, if the mobile device 100 employs a touch screen, the input unit 120 may create an input signal based on a touch event that occurs on a touch panel provided in the display unit 140.

The audio processing unit 130 includes a speaker (SPK) for outputting various audio data received during a call, contained in a received message, or produced by a playback of an audio file stored in the memory unit 150, and a microphone (MIC) for collecting a user's voice and any other audio signals during a call. In some embodiments, the audio processing unit 130 may be restricted in outputting audio data according to a user's input. If a communication channel is formed between certain peripheral audio equipment and the mobile device 100 based on the Bluetooth module 170, and if specific audio data is transmitted to the audio equipment through the Bluetooth® module 170, the audio processing unit 130 may block the output of audio data. The audio processing unit 130 may output predefined audio data through the speaker (SPK) when the Bluetooth module 170 is enabled, when a list of peripheral devices is displayed on the display unit 140, and when a selected communication channel is formed after a specific peripheral device is selected. Alternatively, such audio data may not be outputted depending on a user's setting.

The display unit 140 represents a variety of information inputted by a user or offered to a user, including various menus of the mobile device 100. For instance, the display unit 140 may visually offer various screen views of an idle screen, a menu screen, a message writing screen, a call screen, a game screen, a music playback screen, and the like. Additionally, the display unit 140 may be formed of LCD (liquid crystal display), OLED (organic light emitting diodes), or any other equivalent. If LCD or OLED is fabricated in the form of a touch screen, the display unit 140 may act as an input unit as well. In this case, the display unit 140 may be composed of a display panel and a touch sensor disposed thereon. In some embodiments, the display unit 140 may output a list of selected peripheral devices depending on the Bluetooth® module 170 enabled. A related user interface displayed on the display unit 140 will be described later.

The memory unit 150 stores a variety of applications for functions related to an embodiment of this invention, including an application for a playback of various files stored and an application for operating the Bluetooth® module 170. In addition, if the mobile device 100 employs a touch screen, the memory unit 150 may store a key map, a menu map, and so forth, for the operation of the touch screen. Here, the key map may have various well known types such as a keyboard map, a 3*4 key map, a QWERTY key map, or a special control key map suitable for the operation of a specific application in use. Also, the menu map may be a special menu map suitable for the operation of a specific application in use and may have several menu items offered by the mobile device 100. The memory unit 150 may include of a program region and a data region.

The program region may store an operating system (OS) for booting and operating the mobile device 100, and applications for performing various functions of the mobile device 100, such as a call application, a web browser for surfing on the Internet, an MP3 application for playing digital sounds, an image viewer application for showing image files, a video player application, and the like. In some embodiments, the program region may store a specific program designed to output a list of selected peripheral devices when a search for peripheral devices is performed depending on the Bluetooth module 170.

The peripheral device list output program may contain a routine for acquiring a profile of a specific end-user function or file selected by a user, a routine for sending an inquiry message and then acquiring information about peripheral devices, a routine for outputting the acquired information about peripheral devices, and the like. Here, a profile refers to information for enabling a specific end-user function or file playback. For instance, if there is a certain music file, a profile may include a variety of information related to the music file. In certain embodiments, this invention may use a supported profile that contains service identification indicating whether a relevant end-user function or file is supportable or not.

The peripheral device list output program may contain a routine for retrieving a former list stored in the memory unit 150 when a user selects a specific end-user function or file, a routine for finding information about peripheral devices available for a selected end-user function or file in the retrieved former list, and a routine for forming and displaying a new list of the found peripheral devices. Also, if the former list has no information about peripheral devices available for a selected end-user function or file, or if a user wants to perform a search regardless of the former list, the peripheral device list output program may contain a routine for searching peripheral devices.

The data region stores data and contents created or received while the mobile device 100 is used. In addition, if the display unit 140 is formed of a touch screen, the data region may store user's inputs received from the touch screen. In some embodiments, the data region may store information about various peripheral devices acquired while the Bluetooth® module 170 is operated. Here, information about peripheral devices may include a MAC address, name, and so forth, of each peripheral device. Such information about peripheral devices may be reclassified and then displayed as a list when the Bluetooth® module 170 is used.

The Bluetooth® module 170 is a kind of short range communication module and forms a short range communication channel with peripheral devices including other mobile devices. As well known in the art, Bluetooth® is one of several radio frequency standards for transmission of voice and data over short distances in a point to multi-point. The Bluetooth® module 170 allows a relatively short range communication within a distance from about 10 cm to about 10 m, or in some cases with a distance of up to 100 m. Normally the Bluetooth® module 170 uses the ISM (industrial scientific medical) band (i.e., 2.402 GHz~2.480 GHz) at a transmission speed of approximately 1 Mbps with a low power consumption (approximately 0.3 mA in an idle state, maximum 30 mA in transmission), while using a frequency hopping technique (79/23 hop, 1600 hop/sec) for preventing interference. Additionally, in order to prevent interference between signals, the Bluetooth® module 170 may use a low-guard band of 2.4 GHz~2.402 GHz and an up-guard band of 2.48 GHz~2.4835 GHz. The Bluetooth® module 170 may be classified into three classes according to transmission power, namely, class 1 with 100 mW, class 2 with 2.5 mW, and class 3 with 1mW. Furthermore, the Bluetooth® module 170 uses GFSK (Gaussian frequency shift keying) modulation technique and can support three-channel voices based on A-Law, u-Law PCM, and CVSD (continuous variable slope delta modulation). The Bluetooth® module 170 sends a profile containing service identification to peripheral devices and then receives their responses when establishing communication channels with other Bluetooth modules, thus acquiring information about peripheral devices available for a selected end-user function or file playback.

Figure 2:
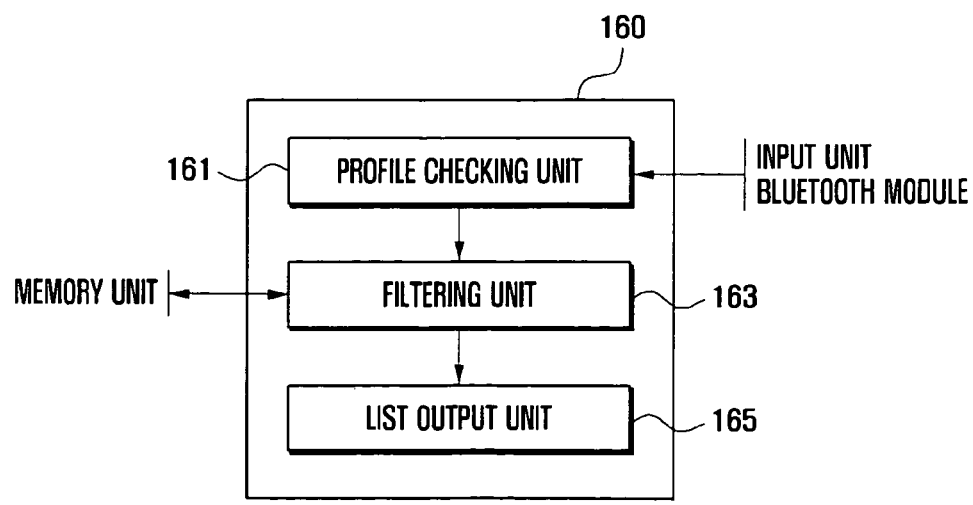
FIG. 2 illustrates a detailed configuration of a control unit shown in FIG. 1.

The control unit 160 controls a power supplying and initializing process for each element of the mobile device 100. After initializing, the control unit 160 may control the flow of signals so as to support a function of displaying a list of selected peripheral devices available for a particular end-user function or file playback depending on the Bluetooth® module 170. For this, the control unit 160 may include a profile checking unit 161, a filtering unit 163, and a list output unit 165, as shown in FIG. 2.

The profile checking unit 161 is configured to check a profile of a specific end-user function or file selected by a user. The profile checking unit 161 may obtain service identification of such an end-user function or file. Here, service identification may be information related to an application for performing a selected end-user function or file. For instance, a music file may contain MP3 service identification, and an image file may contain suitable player service identification. After obtaining service identification of a selected end-user function or file, the profile checking unit 161 sends an inquiry message to peripheral devices and then receives service identification of the respective peripheral devices. At this time, the profile checking unit 161 may deliver a response signal of each peripheral device to the filtering unit 163.

The filtering unit 163 receives a response signal from the profile checking unit 161 and then, based on the received signal, determines which peripheral device can support a specific end-user function or file selected by a user. Additionally, the filtering unit 163 retrieves information about peripheral devices capable of supporting a relevant service and also attempts a "Get name" for acquiring information about peripheral devices, thus reducing a searching speed. Then the filtering unit 163 may deliver the retrieved information about peripheral devices to the list output unit 165. As mentioned above, information about peripheral devices may include a MAC address, name, and so forth, of each peripheral device.

The list output unit 165 produces a list of selected peripheral devices, depending on information about peripheral devices received from the filtering unit 163. Additionally, the list output unit 165 controls the display unit 140 to display the list of selected peripheral devices. The peripheral device list may be produced using the name of peripheral devices. Thereafter, if a user selects a desired one of peripheral devices in the list, the control unit 160 controls the establishment of a short range communication channel with the selected peripheral device.

If there is any process of searching or pairing to perform depending on the Bluetooth® module 170, the mobile device 100 may temporarily store former information about peripheral devices in the memory unit 150. In this case, when a user selects a specific end-user function or file, the profile checking unit 161 may perform a process of acquiring profile information containing service identification and then sending it to the filtering unit 163. The filtering unit 163 may perform a filtering of peripheral device information corresponding to the received service identification by using the former information about peripheral devices stored in the memory unit 150. Then the filtered information about peripheral devices is changed to a list of peripheral devices through the list output unit 165 and displayed on the display unit 140.

In this case, a list produced based on the former information about peripheral devices may have no peripheral device a user desires. Then, at a user's request, the mobile device 100 sends an inquiry message, acquires information about peripheral devices, and displays a list of selected peripheral devices.

Figure 3:
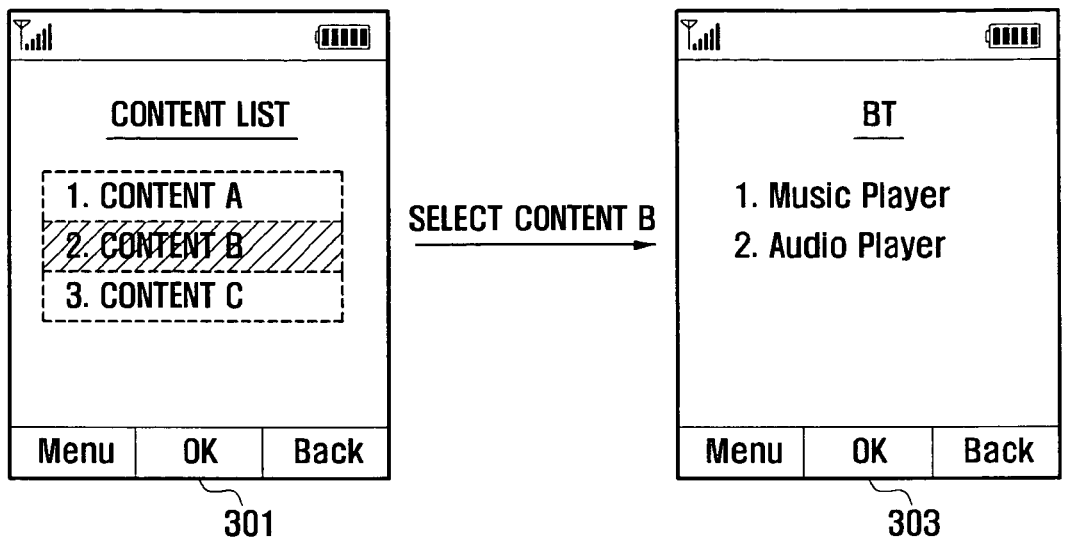
FIG. 3 illustrates a user interface for selectively displaying a list of peripheral devices in accordance with an embodiment of the present invention.

FIG. 3 illustrates a user interface for selectively displaying a list of peripheral devices in accordance with an embodiment of the present invention. Although the following description is based on a selection of content corresponding to a specific file among services of the mobile device 100, this is exemplary only and not to be considered as a limitation of the present invention. The following description may be equally applied to another embodiment in which a service of the mobile device 100 is a specific end-user function. In some embodiments, the mobile device 100 has a history about performing a short range communication function based on the Bluetooth module 170 and therefore former information about peripheral devices is stored in the memory unit 150.

Referring to FIG. 3, when a user performs a content search based on a short range communication, the control unit 160 may display a list of contents on the display unit 140 as shown in a screen view 301. This list is composed of specific contents that can be activated depending on a short range communication. Before displaying the content list, the control unit 160 may offer a menu screen that includes a menu item for a content search based on a short range communication. Also, the control unit 160 may display the content list when a hot key assigned to a content search based on a short range communication is selected. Although three contents A, B and C are shown in the screen view 301, the present invention is not limited to this example. Alternatively, the content list may have any other numbers of contents and various arrangements of contents.

If the content B is selected by a user, the control unit 160 checks a profile of the selected content B. Here, the control unit 160 may check a profile that includes service identification of the content B. After checking a profile of the content B, the control unit 160 may control a filtering of former information about peripheral devices stored in the memory unit 150 depending on the checked profile. At this time, the memory unit 150 may separately store service identification of peripheral devices under the control of the control unit 160. Specifically, the former information about peripheral devices may be stored in the form of a table that contains the name and service identification of each peripheral device. The control unit 160 reads the table and checks the name of peripheral devices corresponding to service identification of the content B. Then the control unit 160 selects items corresponding to service identification of the content B from the former information about peripheral devices and thereby produces a list of selected peripheral devices.

A screen view 303 shows a list of selected peripheral devices. If the content B is an audio file, the control unit 160 may retrieve information about peripheral devices related to a playback of audio files. For instance, the control unit 160 may select a music player and an audio player as selected items of peripheral devices in response to a service of file playback. Then, as shown, the control unit 160 may display a list of selected peripheral devices on the display unit 140.

Thereafter, when a user selects one of the peripheral devices in a list as shown in the screen view 303, the content B may begin to be played through the selected peripheral device. If a short range communication channel is not yet formed with the selected peripheral device, the control unit 160 may perform a given process for forming a short range communication channel with the selected peripheral device in order to play the selected content B.

As discussed heretofore, the mobile device 100 according to an embodiment of this invention retrieves, from the former information about peripheral devices, specific peripheral devices capable of supporting content selected by a user and then arranges the retrieved peripheral devices in a list displayed on the display unit 140, thus allowing a user to easily and quickly select a desired peripheral device.

Figure 4:
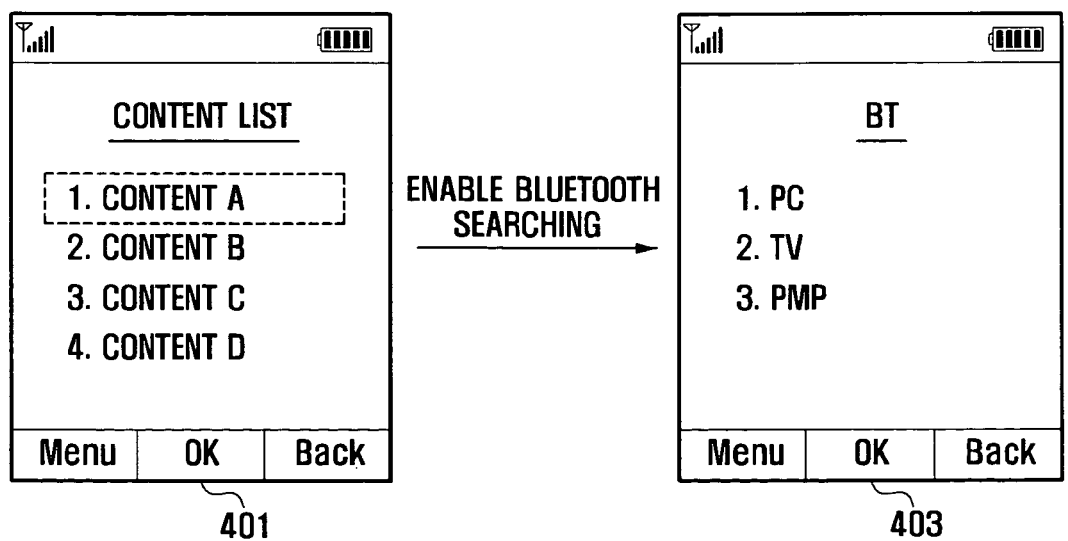
FIG. 4 illustrates a user interface for selectively displaying a list of peripheral devices in accordance with another embodiment of the present invention.

FIG. 4 illustrates a user interface for selectively displaying a list of peripheral devices in accordance with another embodiment of the present invention. This embodiment shown in FIG. 4 displays a list of peripheral devices based on selected content.

Referring to FIG. 4, when a user selects a menu item for viewing a content list in a menu screen or alternatively selects a hot key assigned to viewing a content list, the control unit 160 may display a list of contents on the display unit 140 as shown in a screen view 401. In an example of the screen view 401, the content list contains four contents A, B, C and D. Here, the content A may be a video file, the content B may be an audio file, the content file C may be a photo file, and the content D may be a text file. As discussed above, the content list may have various numbers of contents and various arrangements of contents.

If a user selects the content A in the screen view 401 and then instructs the mobile device 100 to perform a search for peripheral devices based on the Bluetooth® module 170, the control unit 160 checks a profile of the selected content A. Here, the control unit 160 may check a profile that includes service identification of the content A. After checking a profile of the content A, the control unit 160 may create a message containing the checked profile and then send the message to peripheral devices. Namely, if based on the Bluetooth® module 170, the control unit 160 may insert a profile that includes service identification into a message during a pairing process and then send it to peripheral devices. Thereafter, if receiving a response to the message from peripheral devices, the control unit 160 retrieves, from the received response, information about peripheral devices capable of supporting a service of the content A. Also, the control unit 160 produces a list of peripheral devices related to the selected content A by arranging the retrieved information and then displays the produced list on the display unit 140 as shown in a screen view 403. For instance, if the content A is a video file, the control unit 160 may send a profile that includes service identification of a video file playback related to the content A to peripheral devices. Then the control unit 160 displays on the display unit 140 a list of peripheral devices (such as, a PC, a TV and a PMP as shown) that respond to such service identification.

Thereafter, when a user selects one of peripheral devices in a list as shown in the screen view 403, the content A may begin to be played through the selected peripheral device.

As discussed heretofore, if there is no information about peripheral devices in the memory unit 150 and if a user requests a peripheral device search based on the Bluetooth® module 170, the mobile device 100 according to an embodiment of this invention performs a search for peripheral devices capable of supporting a service of content selected by a user and then arranges the searched peripheral devices in a list displayed on the display unit 140.

Now, a method for selectively displaying a list of peripheral devices based on a short range communication will be described in detail.

Figure 5:
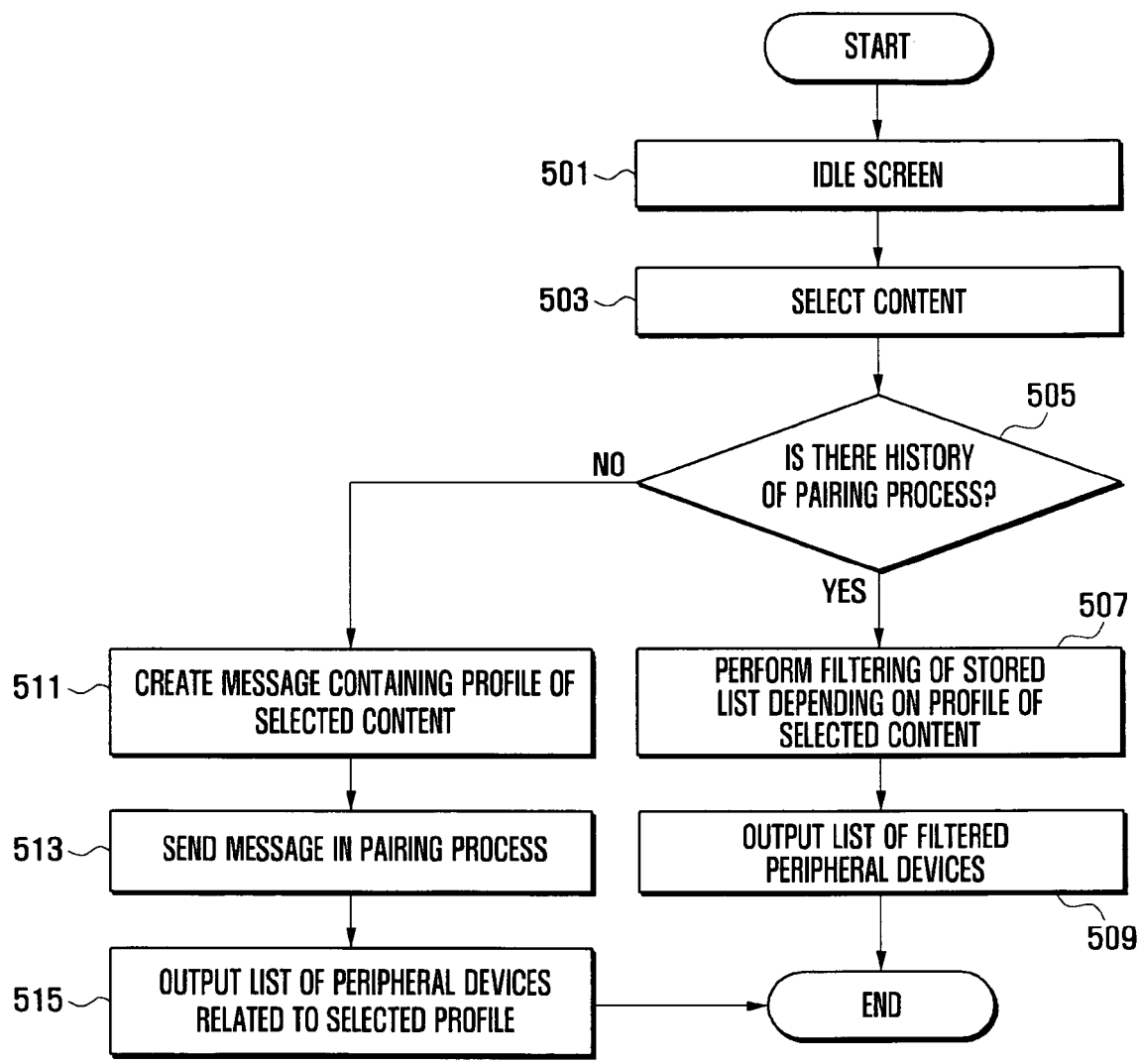
FIG. 5 illustrates a process for selectively displaying a list of peripheral devices in accordance with an embodiment of the present invention.

FIG. 5 illustrates a process for selectively displaying a list of peripheral devices in accordance with an embodiment of the present invention.

Referring to FIG. 5, when power is supplied, the control unit 160 of the mobile device 100 performs a booting process and initializes the respective elements. Then the control unit 160 outputs a predefined idle screen on the display unit 140 (block 501).

Next, the control unit 160 may receive an input signal for selecting specific content (block 503). In this block, the control unit 160 may output a list of given numbers of contents on the display unit 140. Also, the control unit 160 may output a menu screen that includes a menu item for displaying the content list on the display unit 140, or alternatively offer a hot key assigned to displaying the content list. In addition, the control unit 160 may receive an input signal or touch event for selecting specific content in the content list from the input unit 120 or a touch screen. When specific content is selected, the control unit 160 may check a profile of the selected content and then acquire information about the profile.

Next, the control unit 160 determines whether the mobile device 100 has performed a pairing process based on the Bluetooth module 170 (block 505). Namely, the control unit 160 determines whether the Bluetooth® module 170 has been enabled and used to search peripheral devices. If there is a history of performing a pairing process, the control unit 160 performs a filtering of a stored list depending on a profile of selected content (block 507). When the mobile device 100 performs a pairing operation for peripheral devices depending upon the Bluetooth® module 170, the control unit 160 acquires information about peripheral devices and stores the acquired information in the memory unit 150. Therefore, depending upon such former information about peripheral devices stored in memory unit 150, the control unit 160 may perform a filtering process to select specific peripheral device information corresponding to the profile information acquired in the block 503. Then the control unit 160 may output a list of the filtered peripheral devices on the display unit 140 (block 509).

Alternatively, if there is no history of performing a pairing process in the block 505, the control unit 160 may create a message containing a profile of selected content (block 511). In this block, a profile of selected content may have service identification related to a playback of relevant content. Therefore, the created message contains service identification.

Next, the control unit 160 may send a message containing service identification to respective peripheral devices during a pairing process (block 513). Then the respective peripheral devices receive a message from the mobile device 100 and send a response message to the mobile device 100. The response message may contain information about whether a relevant service is supportable or not. Namely, when receiving a message containing service identification from the mobile device 100, each peripheral device checks service identification and then sends a response message to the mobile device 100 by inserting information indicating a supportable service or not into a message. The mobile device 100 receives the response message from the respective peripheral devices and therefore can determine which peripheral device supports a service of selected content. After acquiring information about peripheral devices, the control unit 160 produces a list of peripheral devices related to the selected profile and then displays the produced list on the display unit 140 (block 515).

Although the above description uses a selection of specific content, this invention is not limited thereto. Alternatively, a user may select any end-user function supported by the mobile device 100, such as a game function, a function of forming a short range communication channel based on any other specific short range communication module, and the like. Then the mobile device 100 may acquire a profile that includes service identification related to a selected end-user function and perform the above-discussed process for selectively displaying a list of peripheral devices based on the acquired profile.

As fully discussed hereinbefore, the method for displaying a list of peripheral devices in the mobile device 100 according to embodiments of this invention may allow a selective display of a list that includes specific peripheral devices that are capable of supporting content or end-user function selected by a user.

The above-discussed mobile device 100 may essentially or selectively include any other elements. For instance, the mobile device 100 may further include a digital camera module, a wired or wireless data transmission interface, an Internet access module, a digital broadcast receiving module, and so forth. According to a digital convergence tendency, such elements may be varied, modified and improved in various ways, and any other elements equivalent to the above elements may be additionally or alternatively equipped in the mobile device 100. As will be understood by those skilled in the art, some of the above-mentioned elements in the mobile device 100 may be omitted or replaced with another.

Additionally, the mobile device 100 of this invention may include any types of electronic devices that may perform a short range communication function. For instance, the mobile device may include communication devices, multimedia players and their application equipment, including many mobile communication terminals based on various communication protocols, a portable multimedia player (PMP), a digital broadcasting player, a personal digital assistant (PDA), a music player (e.g., an MP3 player), a portable game console, a smart phone, a notebook, a handheld personal computer, and so forth.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for selectively displaying a list of peripheral devices in a mobile device, the method comprising:
   receiving a selection among an end-user function and a content in the mobile device;
   identifying the selected one of the end-user function and content;
   acquiring a profile corresponding to the selected end-user function or content, the profile being required for enabling a playback of the selected end-user function or content;
   acquiring information about at least one peripheral device that is available to form a short range communication channel with the mobile device;
   identifying which of the at least one peripheral device is capable of enabling the playback of the selected end-user function or content at the at least one peripheral device based on the profile and the information acquired about the at least one peripheral device, wherein identifying which of the at least one peripheral device is capable of enabling the playback comprises filtering, in response to detecting a plurality of peripheral devices available to form the short range communication channel with the mobile device, the available peripheral devices down to only the at least one peripheral device capable of enabling the playback of the selected end-user function or content at the at least one peripheral device; and
   displaying a list of the identified at least one peripheral device,
   wherein the profile comprises information related to an application for performing the selected end-user function or content.

2. The method of claim 1, wherein the profile comprises a service identification of the selected end-user function or content.

3. The method of claim 2, wherein acquiring the information about the at least one peripheral device includes:
   inserting the profile that comprises the service identification into a message;
   sending the message to the at least one peripheral device;
   receiving at least one response message from the at least one peripheral device;
   retrieving information about the at least one peripheral device that is capable of supporting a service indicated by the service identification from the at least one received response message; and
   producing the list of the at least one peripheral device based on the retrieved information about the at least one peripheral device.

4. The method of claim 3, wherein sending the message includes sending the message to the at least one peripheral device while performing a pairing process with the at least one peripheral device.

5. The method of claim 2, wherein acquiring the information about the at least one peripheral device includes:
   inserting the profile that comprises the service identification into a message;
   sending the message to the at least one peripheral device;
   receiving at least one response message from the at least one peripheral device that is capable of supporting a service indicated by the service identification; and
   producing the list of the at least one peripheral device based on information about the at least one peripheral device that sends the response messages.

6. The method of claim 1, wherein acquiring the information about the at least one peripheral device includes:
   checking former information about the at least one peripheral device stored in a memory unit;
   retrieving information about the at least one peripheral device corresponding to the profile from the former information; and
   producing the list of the at least one peripheral device based on the retrieved information about the at least one peripheral device.

7. The method of claim 1, wherein the profile comprises information based on the selected end-user function or content.

8. The method of claim 1, wherein the profile comprises information for activating the selected end-user function or content.

9. A mobile device for selectively displaying a list of peripheral devices, the mobile device comprising:
   a controller configured to:
      receive a selection among an end-user function and a content in the mobile device,
      identify the selected one of the end-user function and content of the mobile device,
      acquire a profile corresponding to the selected end-user function or content,
      acquire information about at least one peripheral device that is available to form a short range communication channel with the mobile device, the profile being required for enabling a playback of the selected end-user function or content,
      identify which of the at least one peripheral device is capable of enabling the playback of the selected end-user function or content at the at least one peripheral device based on the profile and the information acquired about the at least one peripheral device, wherein to identify which of the at least one peripheral device is capable of enabling the playback the controller is configured to filter, in response to detection of a plurality of peripheral devices available to form the short range communication channel with the mobile device, the available peripheral devices down to only the at least one peripheral device capable of enabling the playback of the selected end-user function or content at the at least one peripheral device, and
      produce a list of the identified at least one peripheral device;
   a display configured to display the produced list of the at least one peripheral device; and
   a short range communication module configured to form a short range communication channel with the at least one peripheral device,
   wherein the profile comprises information related to an application for performing the selected end-user function or content.

10. The mobile device of claim 9, wherein the controller is configured to:
    check and acquire the profile that contains a service identification of the selected end-user function or content, send a message that includes the profile to at least one peripheral device,
receive at least one response message from the at least one peripheral device,
perform a filtering of information about the at least one peripheral device that is capable of supporting a service indicated by the service identification from the at least one received response message, and
produce and output the list of the at least one peripheral device based on the filtered information about the at least one peripheral device.

11. The mobile device of claim 10, wherein the controller is further configured to control the short range communication module to send the message to the at least one peripheral device while performing a pairing process with the at least one peripheral device.

12. The mobile device of claim 10, wherein the controller is further configured to receive the at least one response message from the at least one peripheral device that is capable of supporting the service indicated by the service identification.

13. The mobile device of claim 9, further comprising:
a memory configured to store information about the at least one peripheral device acquired when a short range communication channel is formed with at least one of the at least one peripheral device that is capable of enabling the end-user function or content based on a short range communication.

14. The mobile device of claim 13, wherein the controller is further configured to:
retrieve information about the at least one peripheral device that is capable of enabling the selected end-user function or content from the memory; and
produce the list of the at least one peripheral device based on the retrieved information about the at least one peripheral device.

15. The mobile device of claim 9, wherein the short range communication module comprises a Bluetooth module configured to communicate with the controller.

16. A mobile device for selectively displaying a list of at least one peripheral device, the mobile device comprising:
an input;
a controller coupled to the input, the controller configured to:
receive a selection among an end-user function and a content in the mobile device,
identify the selected one of the end-user function and content,
acquire a profile of the selected end-user function or content,
acquire information about at least one peripheral device that is available to form a short range communication channel with the mobile device, the profile being required for enabling a playback of the selected end-user function or content,
identify which of the at least one peripheral device is capable of enabling the playback of the selected end-user function or content at the at least one peripheral device based on the profile and the information acquired about the at least one peripheral device, wherein to identify which of the at least one peripheral device is capable of enabling the playback the control unit is configured to filter, in response to detection of a plurality of peripheral devices available to form the short range communication channel with the mobile device, the available peripheral devices down to only the at least one peripheral device capable of enabling the playback of the selected end-user function or content at the at least one peripheral device, and
produce a list of the identified at least one peripheral device;
a display configured to display the produced list of the at least one peripheral device; and
a short range communication module configured to form a short range communication channel with the at least one peripheral device,
wherein the profile comprises information related to an application for performing the selected end-user function or content.

17. The mobile device of claim 16, wherein the controller is configured to:
check and acquire the profile that contains a service identification of the selected end-user function or content,
send a message that includes the profile to the at least one peripheral device,
receive at least one response message from the at least one peripheral device,
perform a filtering of information about the at least one peripheral device that is capable of supporting a service indicated by the service identification from the at least one received response message, and
produce and output the list of the at least one peripheral device based on the filtered information about the at least one peripheral device.

18. The mobile device of claim 17, wherein the controller is further configured to control the short range communication module to send the message to the at least one peripheral device while performing a pairing process with the at least one peripheral device.

19. The mobile device of claim 17, wherein the controller is further configured to receive the at least one response message from the at least one peripheral device that is capable of supporting the service indicated by the service identification.

20. The mobile device of claim 16, further comprising:
a memory configured to store information about the at least one peripheral device acquired when a short range communication channel is formed with at least one of the at least one peripheral device that is capable of enabling the end-user function or content based on a short range communication.

21. The mobile device of claim 20, wherein the controller is further configured to:
retrieve information about the at least one peripheral device that is capable of enabling the selected end-user function or content from the memory; and
produce the list of the at least one peripheral device based on the retrieved information about the at least one peripheral device.

22. The mobile device of claim 16, wherein the short range communication module comprises a Bluetooth module configured to communicate with the control unit.

* * * * *